(12) United States Patent
Kawashima et al.

(10) Patent No.: US 7,231,610 B2
(45) Date of Patent: Jun. 12, 2007

(54) TEXT EDITING ASSISTOR

(75) Inventors: Takashi Kawashima, Kyoto (JP); Takashi Asano, Yokohama (JP); Hisamori Inukai, Zama (JP); Hidehiko Shin, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 790 days.

(21) Appl. No.: 10/721,192

(22) Filed: Nov. 26, 2003

(65) Prior Publication Data

US 2004/0139404 A1 Jul. 15, 2004

(30) Foreign Application Priority Data

Nov. 29, 2002 (JP) ............................. 2002-347184

(51) Int. Cl.
*G06F 3/00* (2006.01)
*G06F 17/27* (2006.01)

(52) U.S. Cl. ......................................... 715/780; 704/9
(58) Field of Classification Search ................ 715/780; 345/780; 704/9
See application file for complete search history.

(56) References Cited

U.S. PATENT DOCUMENTS

2002/0019731 A1* 2/2002 Masui et al. .................... 704/7
2003/0023426 A1* 1/2003 Pun et al. ...................... 704/9
2003/0104839 A1* 6/2003 Kraft et al. ................. 455/566

FOREIGN PATENT DOCUMENTS

JP 2000-48019 2/2000
JP 2000-259617 9/2000

* cited by examiner

*Primary Examiner*—Weilun Lo
*Assistant Examiner*—Shashi K. Becker
(74) *Attorney, Agent, or Firm*—Wenderoth, Lind & Ponack, L.L.P.

(57) ABSTRACT

A text editing assistor comprises a table storing section storing a candidate table, a candidate displaying section, a character sequence finalization section, an environment information acquisition section, a determination section, and a first updating section. The candidate displaying section displays at least one prospective character sequence in response to a character sequence which is input by the user. The character sequence finalization section allows the user to select one of the at least one prospective character sequence displayed by the candidate displaying section as a final character sequence. The environment information acquisition section acquires environment information. When a final character sequence is selected by means of the character sequence finalization section, the determination section determines whether or not to update the candidate table based on the environment information. The first updating section updates the candidate table only when the determination section determines that the candidate table is to be updated.

20 Claims, 10 Drawing Sheets

| INPUT CHARACTER SEQUENCE | PROSPECTIVE CHARACTER SEQUENCE |
|---|---|
| あ(a) | (1)亜(a)   (2)亞(a)   (3)阿(a) |
| あい(ai) | (1)愛(ai)   (2)藍(ai) |
| あいちゃん(aichan) | (1)藍ちゃん(aichan)   (2)愛ちゃん(aichan) |
| ⋮ | ⋮ |
| かよこ(kayoko) | (1)佳代子(kayoko) |
| ⋮ | ⋮ |

| INPUT CHARACTER SEQUENCE | PROSPECTIVE CHARACTER SEQUENCE |
|---|---|
| あ(a) | (1)亜(a)　(2)亞(a)　(3)阿(a) |
| あい(ai) | (1)藍(ai)　(2)相(ai)　(3)挨(ai) |
| あいだ(aida) | (1)合田(aida)　(2)相田(aida) |
| ⋮ | ⋮ |
| かよこ(kayoko) | (1)佳代子(kayoko) |
| ⋮ | ⋮ |

FIG. 17
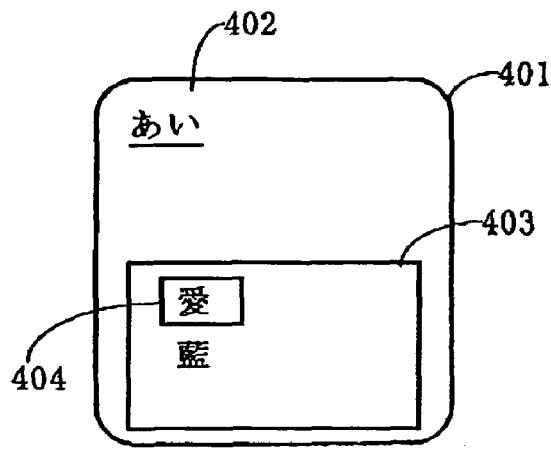
FIG. 18
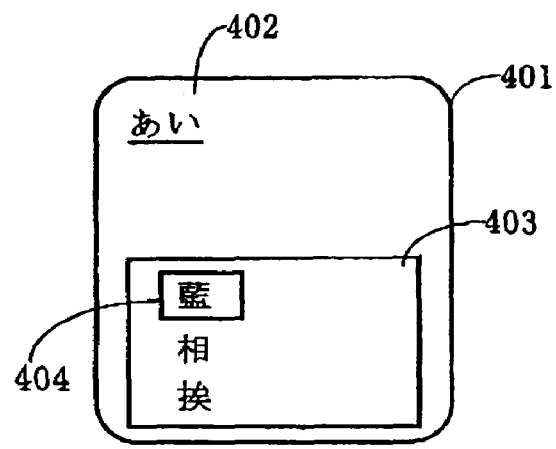
FIG. 19
| INPUT CHARACTER SEQUENCE | PROSPECTIVE CHARACTER SEQUENCE |
|---|---|
| あ(a) | (1)合田(aida)　(2)赤(aka)　(3)阿(a)　(4)愛ちゃん(aichan)　(5)足(ashi)　… |
| い(i) | (1)言う(iu)　(2)いい(ii)　… |
| ⋮ | ⋮ |

TEXT EDITING ASSISTOR

BACKGROUND OF THE INVENTION

1. Field of the Invention

The present invention relates to a text editing assistor, and more particularly to a text editing assistor which displays a prospective character sequence based on a character sequence which is input by a user.

2. Description of the Background Art

The rapid prevalence of cellular phone-based e-mail services in recent years has resulted in much increased opportunities for users to input text via key operations. Under such circumstances, various proposals have been made for realizing text editing assistors which enhance the efficiency and ease of text input operations performed by the user. Behind such needs is the fact that written Japanese consists of different sets of alphabets (hiragana, katakana, etc.), with which further types of characters (Chinese characters, or the English alphabet) may be mixedly used. Furthermore, when a Japanese sentence is typed on a keyboard (as in the case of a computer), it is commonplace to employ the English alphabet system (known as Romaji) to first phonetically type up the Japanese sentence as heard to obtain an input character sequence spelt in hiragana, and then convert portions of the input character sequence to other types of characters such as katakana or Chinese characters. Throughout the present specification, such conversion will be referred to as "finalization", and the entire sequence obtained after the finalization will be referred to as a "final character sequence". Note, however, that a final character sequence is not irrevocably "final", but maybe subjected to further editing by the user, e.g., deletion and/or addition.

A typical example of conventional techniques for enhancing the efficiency and ease of text input operations is presenting prospective character sequences based on a character sequence which is input by a user. For example, for a given character sequence which is input by the user (composed of hiragana, katakana, or the English alphabet (Romaji)), a text editing assistor may present to the user a list of "conversion candidates" (i.e., words or fractions of words as spelt in Chinese characters), the list being presented in an estimated order of frequency. On the other hand, for a given character sequence which is input by the user (e.g., a character sequence "oha"), a text editing assistor may predict the rest of the word and present the result of the prediction as a "prediction candidate" (e.g., "ohayo", or 'good morning'). Hereinafter, more specific instances of such techniques will be described.

One specific example is a technique of presenting to the user a curtailed list of candidates, from which unlikely or impossible candidates are omitted. In this technique, automatic predictions are made in the middle of the user's inputting operation of a character sequence. Then, based on consistency with any previously-finalized sequence of Chinese characters, hiragana, and/or katakana, or user instructions as to which conversion candidates are adopted or dismissed, a curtailed list of candidates from which unnecessary prospective character sequences are omitted is presented to the user. Thus, the burden of the user's input operations is reduced.

Another specific example is a technique in which prospective character sequences to be presented to the user are "learned" based on input character sequences and finalized character sequences (final character sequences). According to this technique, a prospective character sequence which is selected as a final character sequence for a given input character sequence will be presented as a most prospective character sequence the next time the same character sequence is input. A further modification to a text editing assistor having such a learning function is a technique in which, if a once-finalized character sequence is corrected, the correction is reflected in the learning. This technique works in such a manner that, if a user has inadvertently selected the wrong final character sequence, this wrong final character sequence is prevented from being presented as the most prospective character sequence.

The purpose of using a text editing assistor, or the environment in which it is used, may vary. For example, the same user may use a text editing assistor to write a text for business purposes or use it in a more private situation. Since the frequency which a given character sequence is used varies depending on the purpose and/or environment associated with the text editing assistor, the character sequence to be presented as the most prospective character sequence should also vary depending on the purpose and/or environment associated with the text editing assistor. For example, a sentence like "to whom it may concern" is often used in business situations, and therefore, it would be convenient if such a sentence is presented as a prediction candidate when the user has input a character sequence "to". On the other hand, such a sentence is less often used in private situations, so that it may detract from the user's convenience if the above sentence is presented as a prediction candidate in private situations.

As described above, prospective character sequence which are presented on a conventional text editing assistor do not reflect the purpose or state for/in which the text editing assistor is used. In other words, a conventional text editing assistor will always present the same prospective character sequence in response to a given input sequence, irrespective of the purpose or state. Therefore, depending on the purpose for which the text editing assistor is used, the function of presenting prospective character sequences may not provide much convenience to the user.

SUMMARY OF THE INVENTION

Therefore, an object of the present invention is to provide a text editing assistor which is capable of presenting a prospective character sequence that is suitable to the purpose for which the text editing assistor is used.

The present invention has the following features to attain the object mentioned above. A first aspect of the present invention is directed to a text editing assistor for displaying a prospective character sequence based on a character sequence which is input by a user. The text editing assistor comprises a table storing section, a candidate displaying section, a character sequence finalization section, an environment information acquisition section, a determination section, and a first updating section. The table storing section stores a candidate table which associates one or more prospective character sequences with a given character sequence. The candidate displaying section displays, in response to a character sequence which is input by the user, at least one prospective character sequence which is associated by the candidate table with the character sequence which has been input by the user. The character sequence finalization section allows the user to select one of the at least one prospective character sequence displayed by the candidate displaying section as a final character sequence. The environment information acquisition section acquires environment information concerning the text editing assistor or an environment thereof. When a final character sequence is selected by means of the character sequence finalization section, the determination section determines whether or not to update the candidate table based on the environment information. The first updating section updates the candidate table based on an association between the final character sequence selected by means of the character sequence finalization section and the character sequence which has been input by the user, the update being made only when the determination section determines that the candidate table is to be updated.

A second aspect of the present invention is directed to a text editing assistor for displaying a prospective character sequence based on a character sequence which is input by a user. The text editing assistor comprises a table storing section, an environment information acquisition section, a table determination section, a candidate displaying section, a character sequence finalization section, and a first updating section. The table storing section stores a plurality of candidate tables each of which associates one or more prospective character sequences with a given character sequence, each candidate table containing a different set of such associations. The environment information acquisition section acquires environment information concerning the document editing assistor or an environment thereof. The table determination section determines one of the plurality of candidate tables stored in the table storing section based on the environment information acquired by the environment information acquisition section. The candidate displaying section displays, in response to a character sequence which is input by the user, at least one prospective character sequence which is associated by the candidate table determined by the table determination section with the character sequence which has been input by the user. The character sequence finalization section allows the user to select one of the at least one prospective character sequence displayed by the candidate displaying section as a final character sequence. The first updating section updates the candidate table determined by the table determination section based on an association between the final character sequence selected by means of the character sequence finalization section and the character sequence which has been input by the user.

As the environment information, the environment information acquisition section may acquire: information indicating a current time; information indicating a current position of the document editing assistor; information indicating a type of application which accepts an inputting of a character sequence; or information indicating a state of an application which accepts an inputting of a character sequence.

The text editing assistor may further comprise an input accepting section and a second updating section. The input accepting section accepts at least two kinds of input methods for inputting a selection of a final character sequence by means of the character sequence finalization section. The second updating section is operable to update the candidate table based on the association between the final character sequence selected by means of the character sequence finalization section and the character sequence which has been input by the user when the input accepting section accepts a selection of the final character sequence by the first input method, and not update the candidate table when the input accepting section accepts a selection of the final character sequence by a second input method which is different from the first input method.

The text editing assistor may further comprise: a designation section for allowing the user to designate an association between a character sequence and a prospective character sequence in the candidate table, and a deletion section for deleting from the candidate table the association between the character sequence and the prospective character sequence designated by means of the designation section.

The candidate table may associate a plurality of prospective character sequences, in an order of being displayed by the candidate displaying section, with a given character sequence. In this case, the text editing assistor further comprises a changing section for changing the order of the prospective character sequences associated by the candidate table with the given character sequence.

The present invention can be implemented as a program. By recording such a program on a recording medium, it becomes possible to practice the present invention on a separate computer system.

Thus, according to the first aspect, whether or not to perform learning (i.e., updating of the candidate table) can be determined based on environment information. Therefore, updating of the candidate table is performed only when updating is determined as necessary in light of the environment concerning the text editing assistor itself. In other words, according to the present invention, it is possible to present prospective character sequences which are suitable for the purpose for which the text editing assistor is used.

Thus, according to the second aspect, the candidate table to be used for presenting prospective character sequences is switched depending on the environment information. As a result, candidate tables which are adapted to as many different environments as there are candidate tables can be generated. In other words, according to the present aspect, it is possible to present prospective character sequences which are suitable for the purpose for which the text editing assistor is used. Since different candidate tables are used depending on the purpose for which the user uses the text editing assistor, it becomes possible to vary the prospective character sequences to be presented.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a diagram illustrating an exemplary image of prospective character sequences displayed in the case where the first candidate table is used;

FIG. 18 is a diagram illustrating an exemplary image of prospective character sequences displayed in the case where the second candidate table is used; and FIG. 19 shows an exemplary candidate table which associates input character sequences and prediction candidate character sequences.

DESCRIPTION OF THE PREFERRED EMBODIMENTS

Embodiment 1

Figure 1:
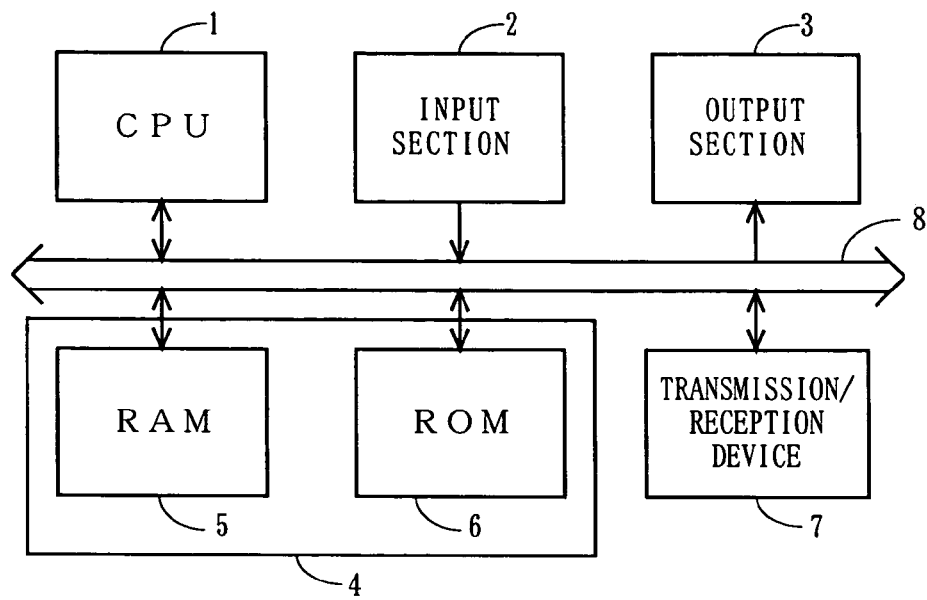
FIG. 1 is a block diagram illustrating the hardware structure of a text editing assistor according to Embodiment 1 of the present invention.

FIG. 1 is a block diagram illustrating the hardware structure of a text editing assistor according to Embodiment 1 of the present invention. In FIG. 1, the text editing assistor comprises a central processing unit (CPU) 1, an input section 2, an output section 3, a storage section 4, and a transmission/reception device 7. These elements are interconnected via a system bus 8. The text editing assistor shown in FIG. 1 may be implemented as, for example, a cellular phone or a PDA (Personal Digital Assistant). However, the text editing assistor may also be implemented as a desk-top type personal computer, instead of a mobile terminal.

The CPU 1 executes a predetermined program, which is stored in the storage section 4, to perform the program processes (described later). The input section 2, which may be composed of a keyboard, buttons, a mouse, a microphone, or the like, accepts text or instructions which are input by a user. The output section 3, which may be composed of a display device (e.g., a computer display) and/or an audio output device (e.g., a loudspeaker), functions to display images or output audio representing the data which is output from the CPU 1. The storage section 4, which may be composed of a RAM 5, a ROM 6, or the like, is used for the predetermined program processes performed by the CPU 1, and also for storing a candidate table (described later) and optionally a dictionary table. The storage section 4 may comprise a hard disk or any recording medium which is removable from the text editing assistor, e.g., a CD-ROM. The transmission/reception device 7 performs data communications with an external device (not shown) in wireless fashion or via a transmission path. The CPU 1 performs data exchange with the external device by means of the transmission/reception device 7.

Figure 2:
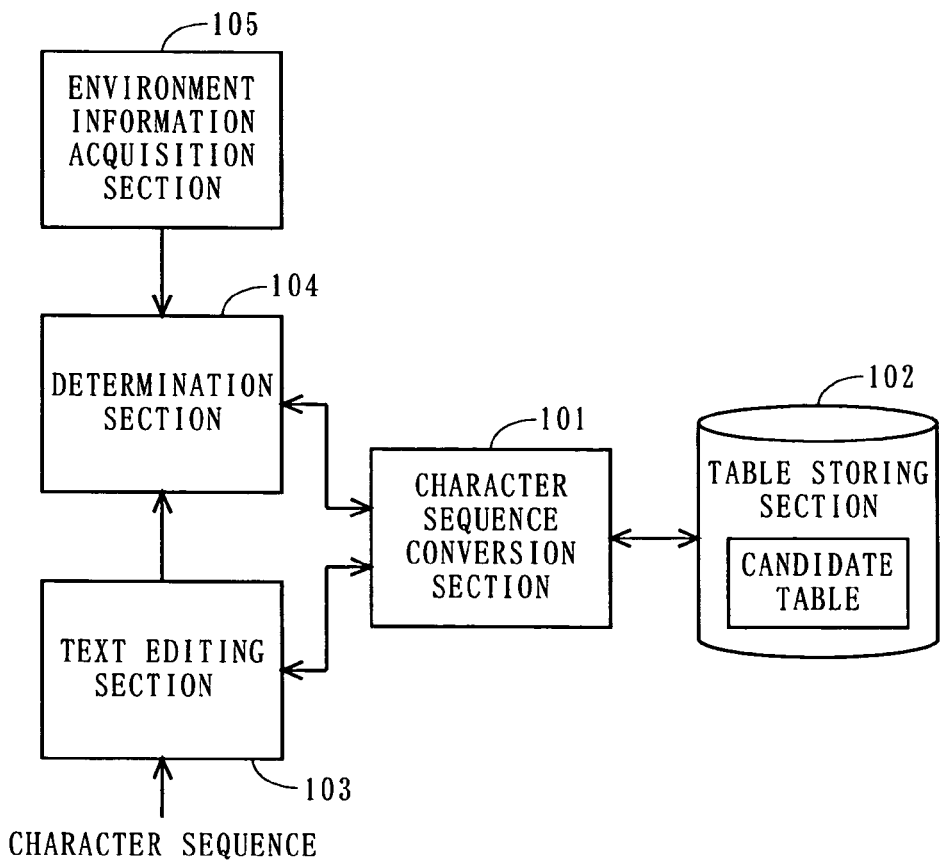
FIG. 2 is a functional block diagram illustrating the text editing assistor according to Embodiment 1.

FIG. 2 is a functional block diagram illustrating the text editing assistor according to Embodiment 1. As shown in FIG. 2, the text editing assistor comprises a character sequence conversion section 101, a table storing section 102, a text editing section 103, a determination section 104, and an environment information acquisition section 105. The table storing section 102 is implemented by the RAM 5 shown in FIG. 1. The other elements shown in FIG. 2 are implemented as predetermined programs (described later with reference to FIG. 5) performed by the CPU 1 shown in FIG. 1.

The text editing section 103 accepts text input operations by the user, and causes the display device of the output section 3 to display a screen on which to allow the user to input text. Specifically, when the input section 2 is operated by the user, the text editing section 103 receives input information representing the operation performed by the user from the input section 2. Furthermore, based on the input information, the text editing section 103 generates a character sequence, and causes the display device of the output section 3 to display the generated character sequence. Thus, the character sequence which has been input by the user is displayed. The character sequence which has been input by the user is referred to as an "input character sequence". The input character sequence is typically a character sequence composed of hiragana, katakana, and/or the English alphabet (Romaji). The input character sequence which has been generated by the text editing section 103 is passed to the character sequence conversion section 110. The input character sequence is displayed on the display device.

The text editing section 103 also causes the display device of the output section 3 to display prospective character sequences which is received from the character sequence conversion section 101. As used herein, a "prospective character sequence" is a notion encompassing both a conversion candidate character sequence and a prediction candidate character sequence. A "conversion candidate character sequence" is a character sequence composed of Chinese characters corresponding to an input character sequence. For example, conversion character sequences "亜(a)", "唖(a)", "阿(a)", and the like correspond to the input character sequence "あ(a)". Note that the present specification assumes that a "character sequence" may be composed of a single character, or contain a plurality of characters. A "prediction candidate character sequence" is a character sequence that begins with the input character sequence. Examples of prediction candidate character sequences corresponding to the input character sequence "あい(ai)" are character sequences such as "あいさつ(挨拶) (aisatsu)" and "あいだ(間) (aida)". In Embodiment 1, it is assumed that the prospective character sequences are conversion candidate character sequences.

After displaying the conversion candidate character sequence, the text editing section 103 waits for the user's operation of selecting a final character sequence. Specifically, the user employs the input section 2 to select a desired character sequence among those displayed as conversion candidate character sequences. The conversion candidate character sequence which has been thus selected by the user is the final character sequence. The selection of the final character sequence marks accomplishment of the inputting of the text. The text editing section 103 passes the final character sequence to the character sequence conversion section 101.

Other than that, the text editing section 103 displays an image on which to perform editing of the candidate table (described later), or awaits user's instructions. Furthermore, the text editing section 103 instructs the determination section 104 whether or not to perform learning (i.e., updating of the candidate table), in accordance with the user's instruction.

The character sequence conversion section 101 receives from the text editing section 103 the character sequence which has been input by the user (input character sequence). From within the candidate table stored in the table storing section 102, the character sequence conversion section 101 retrieves, if any, a prospective character sequence corresponding to the input character sequence received from the text editing section 103. As used herein, the "candidate table" is a table which associates input character sequences with prospective character sequences. The candidate table is used, when an input character sequence is provided, to provide corresponding prospective character sequences as conversion candidates. If any prospective character sequence is found within the candidate table as a result of the search, the character sequence conversion section 101 passes the prospective character sequence(s) in the candidate table to the text editing section 103.

Upon receiving the final character sequence from the text editing section 103, the character sequence conversion section 101 inquires to the determination section 104 as to whether or not to perform learning, i.e., whether or not to update the candidate table. If the result of the inquiry indicates that learning is to be performed, the candidate table is updated based on the correspondence between the received final character sequence and the input character sequence. Furthermore, in the case where editing of the candidate table is to be performed by the text editing section 103, the character sequence conversion section 101 updates the content of the candidate table in accordance with instructions from the text editing section 103.

Figures 3, 4:
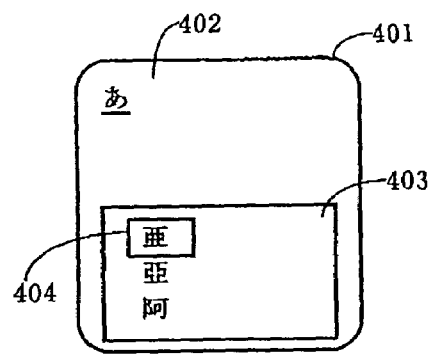
FIG. 3 shows an exemplary candidate table stored in a table storing section 102.
FIG. 4 is a diagram illustrating an exemplary image displayed by the text editing assistor according to Embodiment 1.

The table storing section 102 stores the candidate table. FIG. 3 shows an exemplary candidate table stored in a table storing section 102. As shown in FIG. 3, in the candidate table, input character sequences are associated with prospective character sequences. The example shown in FIG. 3 assumes that the prospective character sequences are conversion candidate character sequences. It will be seen that one or more prospective character sequences are associated with each input character sequence. The prospective character sequences are assigned with numbers indicating the order in which they are to be displayed as candidates. For example, for the input character sequence "あ(a)", character sequences "亜(a)", "唖(a)", and "阿(a)" are associated as the first, second, and third prospective character sequences, respectively.

FIG. 4 is a diagram illustrating an exemplary image displayed by the text editing assistor according to Embodiment 1, in the case where the content of the candidate table is as shown in FIG. 3. In FIG. 4, a displayed screen 401 includes an editing area 402 in which the accomplished text and the input character sequence are displayed, and a candidate area 403 in which prospective character sequences are displayed. Also shown in the candidate area 403 is a cursor 404 which is used to select a final character sequence. If the prospective character sequences corresponding to the input character sequence "あ(a)" are as shown in FIG. 3, these prospective character sequences are to be shown in the candidate area 403 in the order of "亜(a)", "唖(a)", and "阿(a)" from the top, as shown in FIG. 4. By default, the cursor 404 is shown at the first prospective character sequence "亜(a)". Thus, it is preferable to give the earliest number to the prospective character sequence which is most likely to be selected as final character sequence, so that the first prospective character sequence "亜(a)" can be immediately designated when the user selects a final character sequence from among the prospective character sequence. Therefore, in the learning process of the candidate table according to Embodiment 1, the candidate table is updated so that a prospective character sequence that was most recently selected as a final character sequence comes in the first place.

The determination section 104 determines whether or not to update the candidate table when the final character sequence is selected. Specifically, having received the final character sequence from the text editing section 103, the character sequence conversion section 101 inquires to the determination section 104 as to whether or not to perform learning. In response to this inquiry, the determination section 104 determines whether or not to update the candidate table. This determination is to be made based on environment information which is acquired by the environment information acquisition section 105. Rules for making determinations on the basis of the environment information are previously set in the determination section 104. In Embodiment 1, a mode indicating whether or not to perform learning is set in the text editing assistor: a learning mode (i.e., learning is to be performed) or a non-learning mode (i.e., learning is not to be performed). The determination section 104 sets either the learning mode or the non-learning mode based on the result of the above determination.

The environment information acquisition section 105 acquires environment information concerning an environment which the text editing assistor is in. As used herein, "environment information" is a notion encompassing, for example, time information indicating a current time, position information indicating a current position of the text editing assistor, application information indicating an application which is being executed in the text editing assistor to handle text editing, and state information indicating a state of the application which handles text editing. The environment information acquisition section 105 passes the acquired environment information to the determination section 104. The method of acquiring the environment information may comprise acquiring environment information within the device itself through the use of a GPS or timer means, or externally acquiring environment information by utilizing a Bluetooth™ or infrared-based communications function or a wireless LAN-based communications function.

In accordance with the structure described above with reference to FIG. 2, the text editing assistor according to Embodiment 1 is able to determine whether or not to perform learning (i.e., updating of the candidate table) based on the environment information. As a result, the text editing assistor updates the candidate table only when updating is determined as necessary in light of the environment concerning the text editing assistor itself.

Figure 5:
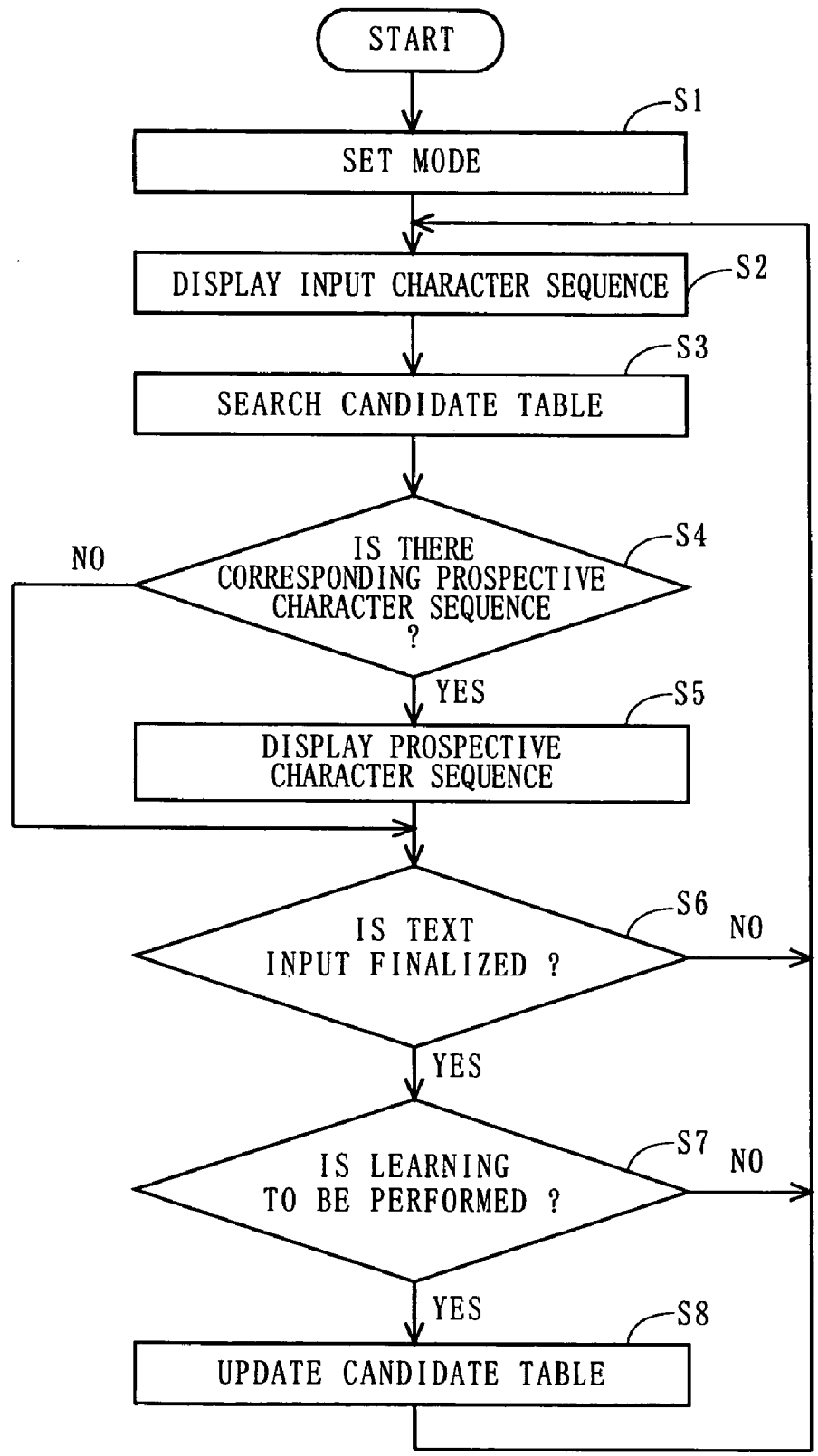
FIG. 5 is a flowchart illustrating a flow of processes performed by the text editing assistor according to Embodiment 1.

Next, a flow of processes performed by the text editing assistor according to Embodiment 1 will be described. FIG. 5 is a flowchart illustrating a flow of processes performed by the text editing assistor according to Embodiment 1. A program for causing the CPU 1 to perform the processes shown in FIG. 5 is stored in the ROM 6 of the text editing assistor.

The flow of processes shown in FIG. 5 may begin in response to, for example, activation of an application which handles text editing, or turning-on of the power of the text editing assistor. First, a mode is set in step S1. Specifically, the text editing section 103 instructs the determination section 104 to set a mode. Having received this instruction from the text editing section 103, the determination section 104 instructs the environment information acquisition section 105 to acquire environment information. In response to the instruction from the determination section 104, the environment information acquisition section 105 acquires environment information, and passes it to the determination section 104. Based on the environment information received from the environment information acquisition section 105, the determination section 104 determines whether or not to update the candidate table, and either a learning mode or a non-learning mode is set accordingly. At the time when step S1 is performed, a screen on which to allow the user to input text (see FIG. 4) is displayed on the output section 3.

Next, at step S2, the text editing section 103 causes the input character sequence to be displayed on the output section 3. Specifically, the text editing section 103 generates an input character sequence based on the text input operations which were performed after a previous run of step S2 and before the current run of step S2, and causes the output section 3 to display the generated input character sequence. The generated input character sequence is passed to the character sequence conversion section 101.

Next to step S2, at step S3, the character sequence conversion section 101 searches for pairs consisting of the input character sequence received from the text editing section 103 and prospective character sequences corresponding thereto. At step S4, based on the search result, the character sequence conversion section 101 determines whether there exists any prospective character sequence corresponding to the input character sequence received from the text editing section 103.

If step S4 finds that there exists any prospective character sequence that corresponds to the input character sequence (step S4; YES), the process of step S5 is performed. At step S5, the character sequence conversion section 101 passes the prospective character sequence(s) acquired from the candidate table in the table storing section 102 to the text editing section 103. The text editing section 103 causes the output section 3 to display the received prospective character sequence(s). On the other hand, if step S4 finds that no prospective character sequence exists that corresponds to the input character sequence (S4; NO), the process of step S5 is skipped, and the process of step S6 is performed instead.

At step S6, the text editing section 103 determines whether the text input has been finalized. Specifically, the text editing section 103 first waits for the user's operation of selecting a final character sequence. If such a selection operation is made, the text editing section 103 determines that the text inputting has been finalized. At this time, the text editing section 103 passes the final character sequence to the character sequence conversion section 101. Thereafter, the process of step S7 is performed. On the other hand, if no such selection operation is made, but a further inputting of a character sequence is made instead, the text editing section 103 determines that the text inputting has not been finalized yet, and the process of step S2 is again performed.

At step S7, the character sequence conversion section 101 determines whether or not to perform learning. This determination is made based on the mode which was set in step S1. In other words, the character sequence conversion section 101 determines that learning is to be performed if the learning mode has been set, and determines that learning is not to be performed if the non-learning mode has been set.

If step S7 finds that learning is not to be performed (S7; NO), control returns to step S2; in this case, no change is made to the candidate table. On the other hand, if step S7 finds that learning is to be performed (S7; YES), the character sequence conversion section 101 updates the candidate table in accordance with the correspondence between the input character sequence and final character sequence. Specifically, the candidate table is updated so that, when prospective character sequences with respect to the current input character sequence are to be displayed the next time, the currently-selected final character sequence will be displayed as the most prospective character sequence (i.e., so as to be displayed in the first place).

Now, a specific instance of the progress of the processing shown in FIG. 5 will be described while illustrating how the displayed screen may transition. FIG. 6 to FIG. 9 are diagrams illustrating exemplary images displayed when the processes shown in the flowchart of FIG. 5 are performed. In the following descriptions of FIG. 6 to FIG. 9, it is assumed that the candidate table has the content as shown in FIG. 3 at the start of the processing, and that the user inputs an input character sequence "あい(ai)".

Figure 6:
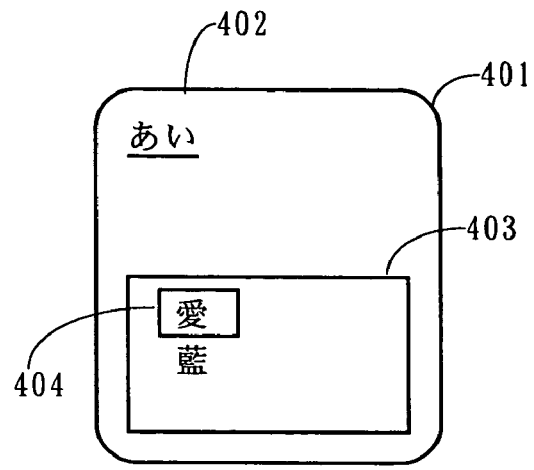
FIG. 6 is a diagram illustrating an exemplary image displayed when the processes shown in the flowchart of FIG. 5 are performed.
Figure 7:
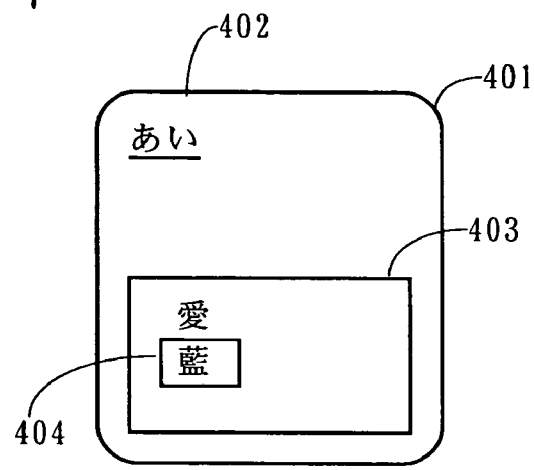
FIG. 7 is a diagram illustrating an exemplary image displayed when the processes shown in the flowchart of FIG. 5 are performed.
Figure 8:
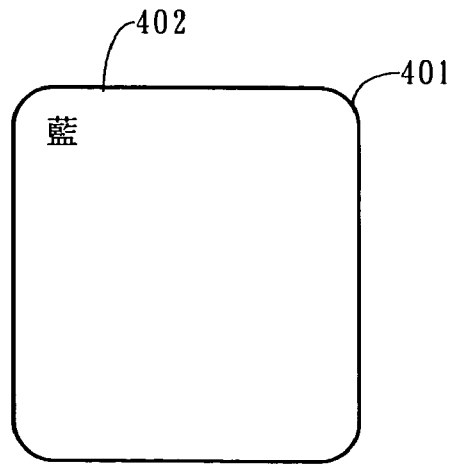
FIG. 8 is a diagram illustrating an exemplary image displayed when the processes shown in the flowchart of FIG. 5 are performed.
Figure 9:
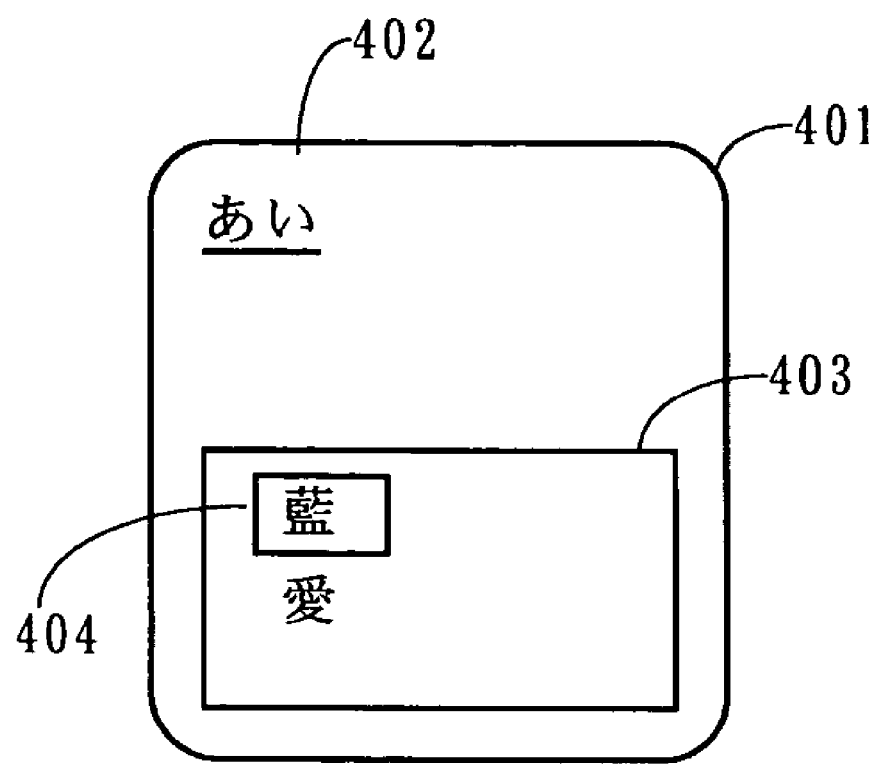
FIG. 9 is a diagram illustrating an exemplary image displayed when the processes shown in the flowchart of FIG. 5 are performed.

First, when the user inputs "あ(a)", the displayed screen 401 will be a shown in FIG. 4. When the user subsequently inputs "い(i)", the input character sequence "あい(ai)" and prospective character sequences corresponding thereto are displayed, resulting in a displayed screen 401 as shown in FIG. 6. In FIG. 6, "愛(a1)" and "藍(ai)" are displayed in the first and second places, respectively, in accordance with the order described in the candidate table. It can be seen that the cursor 404 is pointing to "愛(ai)" in FIG. 6. Next, when the user moves the cursor 404 to "藍(ai)", the displayed screen 401 will appear as shown in FIG. 7. Furthermore, if the user selects "藍(ai)" as the final character sequence, the displayed screen will appear as shown in FIG. 8. It is herein assumed that the input character sequence is underlined, whereas the final character sequence (i.e., accomplished text) is not accompanied by an underline. It is further assumed that the candidate area 403 is not displayed unless an input character sequence is input. If the learning mode has been set prior to performing the operations illustrated in FIG. 6 to FIG. 8, the candidate table is updated when the user selects "藍(ai)" as the final character sequence. In other words, "藍(ai)" and "愛(a1)", respectively, now become the first and second prospective character sequences corresponding to the input character sequence "あい(ai)". Accordingly, when the input character sequence "あい(ai)" is generated next time, the displayed screen will appear as shown in FIG. 9. On the other hand, if the non-learning mode has been set prior to performing the operations illustrated in FIG. 6 to FIG. 9, the candidate table is not updated; therefore, when the input character sequence "あい(ai)" is generated next time, the displayed screen will remain the same as it was in the previous time, i.e., as shown in FIG. 6.

Thus, according to Embodiment 1, whether or not to perform learning (i.e., updating of the candidate table) can be determined based on environment information. Therefore, according to Embodiment 1, updating of the candidate table is performed only when updating is determined as necessary in light of the environment concerning the text editing assistor itself.

Specifically, in the case where the environment information is time information indicating a current time, rules may be set in the determination section 104 such that updating of the candidate table is to be performed if the current time is in the daytime, but not to be performed if the current time is in the nighttime, for example. As a result, character sequences which are selected as final character sequences in the daytime will be displayed as highly prospective character sequences. On the other hand, character sequences which are selected as final character sequences in the nighttime will not affect the order in which prospective character sequences are displayed. Thus, the candidate table will only reflect text editing which is performed during the daytime. In the case where the user is likely to use the text editing assistor for business purposes in the day time but for private purposes in the nighttime, for example, the candidate table will only reflect text editing which is performed for business purposes. As a result, the efficiency of text input operations which are performed for business purposes can be enhanced.

In the case where the environment information is position information indicating a current position, rules may be set in the determination section 104 such that updating of the candidate table is to be performed if the current position is in the neighborhood of the user's workplace, but not to be performed if the current position is in the neighborhood of user's home, for example. This will also make it possible to determine whether or not to update the candidate table depending on whether the text editing assistor is being used for business purposes or for private purposes, so that similar effects to those obtained in the case where the environment information is a current time can be obtained.

In the case where the environment information is application information indicating an application which is being executed by the text editing assistor for handling text editing, it becomes possible to generate a candidate table which reflects text editing which is performed only on a predetermined application.

Alternatively, the environment information maybe state information indicating a state of an application which handles text editing. As used herein, "state information" may be, for example, information indicating a particular text editing function of an application having a plurality of functions. More specifically, state information may be information indicating either function of an application having a mail function and a schedule function. For example, rules may be set in the determination section 104 such that updating of the candidate table is to be performed if the state information as environment information indicates the mail function, but not to be performed if the state information indicates the schedule function. As a result, it becomes possible to generate a candidate table which only reflects text editing which is performed using the mail function.

In the case where the application is a mailer, the state information may be information indicating an addressee of mail. As a result, it becomes possible to generate a candidate table which only reflects editing of mail that is directed to a particular person (addressee).

Furthermore, according to Embodiment 1, the user can edit the content of the candidate table. Specifically, the user can delete a pair of an input character sequence and a prospective character sequence, or change the priority order of prospective character sequences in the candidate table.

Hereinafter, the processes which are performed by the text editing assistor during an editing of the content of the candidate table will be described.

Figure 10:
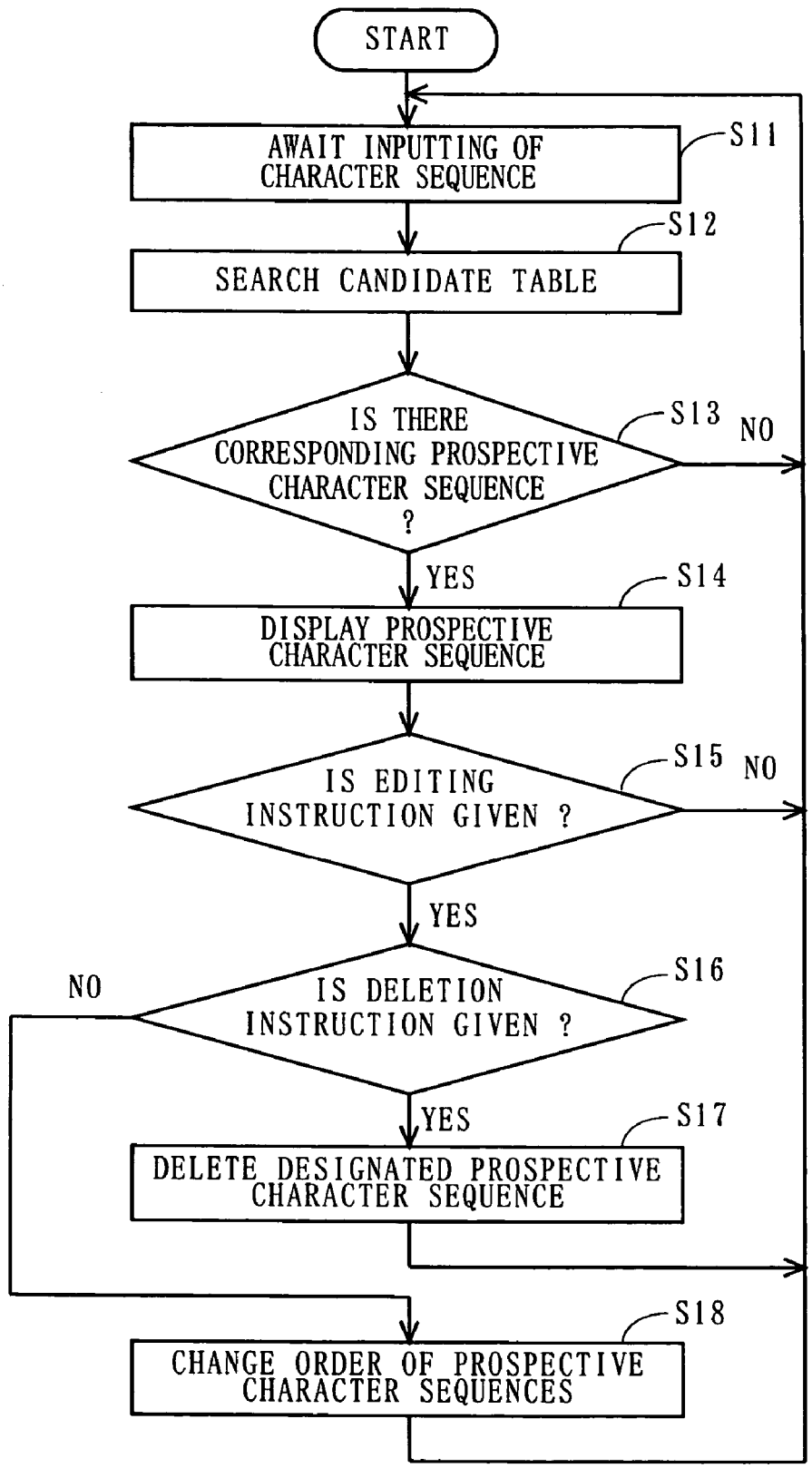
FIG. 10 is a flowchart illustrating a flow of processes performed during an editing of the content of a candidate table.

FIG. 10 is a flowchart illustrating a flow of processes performed during an editing of the content of the candidate table. The process shown in FIG. 10 may begin in response to, for example, an instruction from the user to edit the content of the candidate table (hereinafter an "editing instruction"). It is assumed that the processing shown in FIG. 10 is ended when the user instructs ending of the editing. In FIG. 10, the processes of steps S11 to S14 are similar to the processes of steps S2 to S5 shown in FIG. 4, and any detailed description thereof is omitted.

At step S15, the text editing section 103 determines whether the user has given an editing instruction or not. Specifically, the text editing section 103 waits for an inputting of an editing instruction from the user. If such an input is made, the text editing section 103 determines that an editing instruction has been given; thereafter, the process of step S16 is performed. On the other hand, if no such instruction is input, but a character sequence is input instead, the text editing section 103 determines that an editing instruction is not being given; thereafter, the process of step S11 is performed.

At step S16, the text editing section 103 determines whether the editing instruction given at step S15 is a deletion instruction or not (note that Embodiment 1 assumes two types of editing instructions: a deletion instruction and an order change instruction). If the editing instruction given at step S15 is a deletion instruction, the text editing section 103 deletes from the displayed screen 401 a prospective character sequence specified by the user at step S17. At this time, the prospective character sequence is also deleted from the candidate table. The user can designate a prospective character sequence to be deleted by moving the cursor 404 shown in FIG. 4 and the like. After S17, the process of step S11 is performed.

On the other hand, if the editing instruction given at step S15 is an order change instruction, the text editing section 103 changes the priority order of the prospective character sequences designated by the user at step S18. The user can designate a prospective character sequence whose priority ranking is to be changed by moving the cursor 404 shown in FIG. 4 and the like. Furthermore, the user gives an instruction to move up the priority ranking of the designated prospective character sequence or an instruction to move down the priority ranking of the designated prospective character sequence, thereby changing the priority order of the prospective character sequences. At this time, the priority ranking of the prospective character sequence as stored in the candidate table is also changed. After S18, the process of step S11 is performed.

Figure 11:
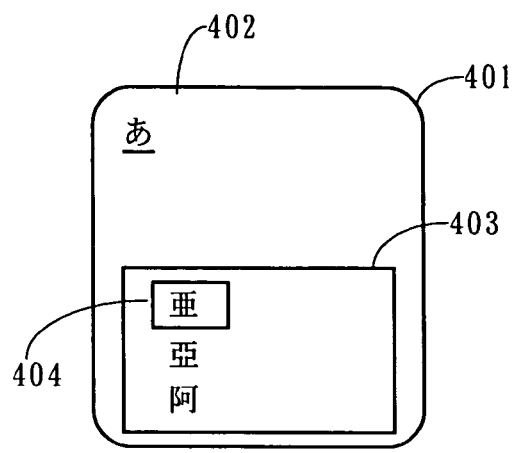
FIG. 11 is a diagram illustrating an exemplary image displayed when the processes shown in the flowchart of FIG. 10 are performed.
Figure 12:
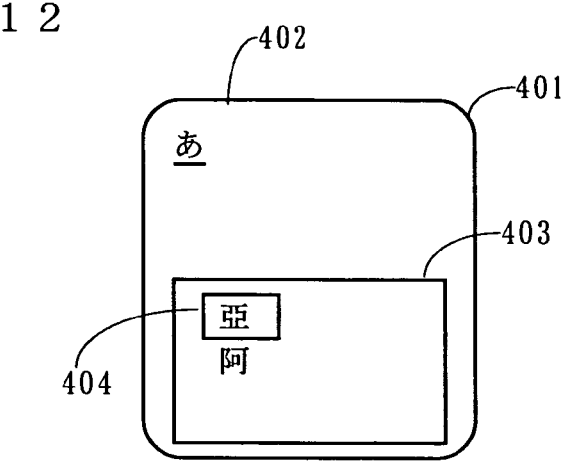
FIG. 12 is a diagram illustrating an exemplary image displayed when the processes shown in the flowchart of FIG. 10 are performed.
Figure 13:
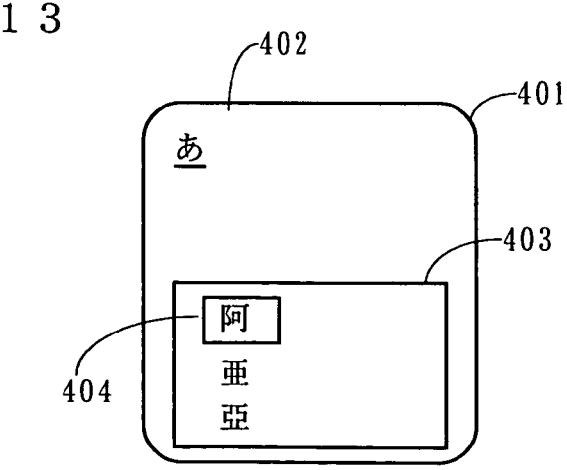
FIG. 13 is a diagram illustrating an exemplary image displayed when the processes shown in the flowchart of FIG. 10 are performed.

Now, a specific instance of the progress of the processing shown in FIG. 10 will be described while illustrating how the displayed screen may transition. FIG. 11 to FIG. 13 are diagrams illustrating exemplary images displayed when the processes shown in the flowchart of FIG. 10 are performed. In the following descriptions of FIG. 11 to FIG. 13, it is assumed that the candidate table has the content as shown in FIG. 3 at the start of the processing.

FIG. 11 shows an exemplary displayed screen displayed when the user has input an input character sequence "あ (a)" (step S14 in FIG. 10). As shown in FIG. 11, three prospective character sequences corresponding to the input character sequence "あ (a)" are displayed. In FIG. 11, in accordance with the content of the candidate table as shown in FIG. 3, "亜(a)", "亞(a)", and "阿(a)" are displayed in the first, second, and third places, respectively.

First, it is assumed that the user has given a deletion instruction to delete the prospective character sequence "畺(a)". The user operates the cursor 404 (which will not need be moved in the exemplary image shown in FIG. 11), and makes an input to give a deletion instruction with the cursor 404 pointing to "畺(a)". Thus, the prospective character sequence "畺(a)" is deleted from the candidate table. As shown in FIG. 12, the prospective character sequence "畺(a)" is also deleted from the displayed screen 401.

Next, it is assumed that the user has given an order change instruction for the prospective character sequence "阿(a)". The user moves the cursor 404, and makes an input to give an order change instruction with the cursor 404 pointing to "阿(a)". Furthermore, the user gives an instruction to move up the priority ranking of the designated prospective character sequence, thereby changing the priority order of the prospective character sequences. As a result, the priority ranking of this prospective character sequence as stored in the candidate table is also changed. Consequently, as shown in FIG. 13, the prospective character sequence "阿(a)" is displayed in the first place in the displayed screen 401.

Thus, according to Embodiment 1, the user is allowed to edit the candidate table, which makes it possible to generate a candidate table which reflects the desire of the user.

Embodiment 2

Next, a text editing assistor according to Embodiment 2 will be described. The text editing assistor according to Embodiment 2 includes a plurality of candidate tables, and employs different candidate tables in accordance with the environment information.

Figures 14, 15:
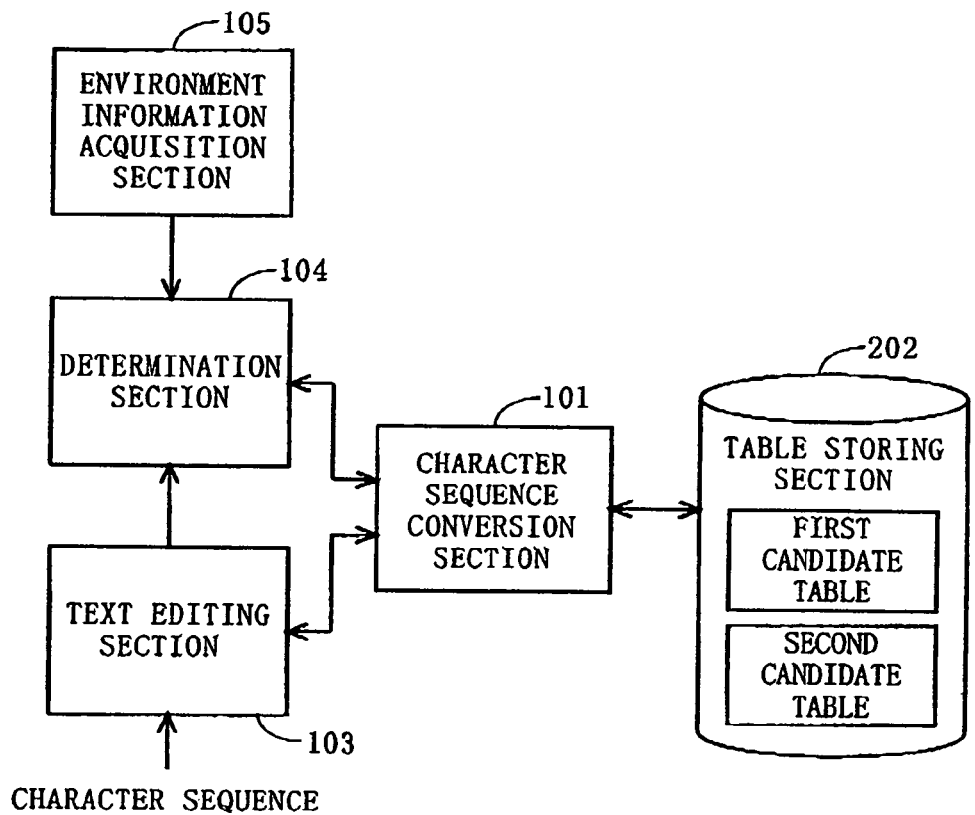
FIG. 14 is a functional block diagram illustrating the text editing assistor according to Embodiment 2.
FIG. 15 shows an exemplary second candidate table stored in a table storing section 202.

FIG. 14 is a functional block diagram illustrating the text editing assistor according to Embodiment 2. FIG. 14 is identical to FIG. 2 except that two candidate tables, i.e., first and second candidate tables, are stored in the table storing section 202. The hardware structure of the text editing assistor according to Embodiment 2 is the same as that according to Embodiment 1, and the descriptions thereof are omitted.

In FIG. 14, it is assumed that the first candidate table has the content as shown in FIG. 3. FIG. 15 shows an exemplary second candidate table stored in the table storing section 202. As seen from FIG. 3 and FIG. 15, associations between input character sequences and prospective character sequences are made differently between the first candidate table and the second candidate table. One of the two candidate tables is used depending on the content of the environment information.

Figure 16:
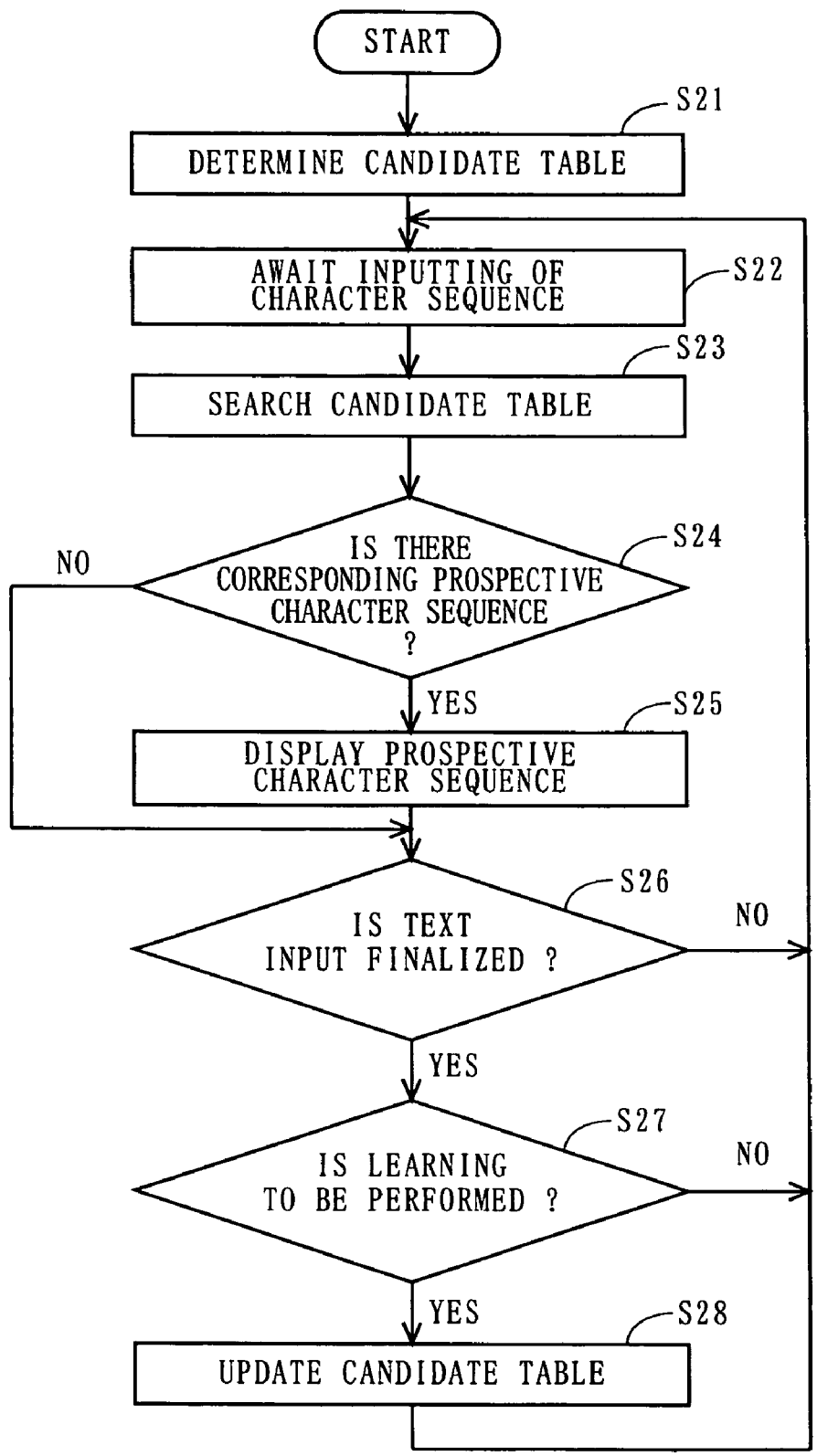
FIG. 16 is a flowchart illustrating a flow of processes performed by the text editing assistor according to Embodiment 2.

Next, a flow of processes performed by the text editing assistor according to Embodiment 2 will be described. FIG. 16 is a flowchart illustrating a flow of processes performed by the text editing assistor according to Embodiment 2. A program for causing the CPU 1 to perform the processes shown in FIG. 16 is stored in the ROM 6 of the text editing assistor. Hereinafter, the processing shown in FIG. 16 will be described with respect to differences from the processing shown in FIG. 5.

The timing of beginning the processing shown in FIG. 16 is similar to that for the processing shown in FIG. 5. First, at step S21, a candidate table to be used for presenting prospective character sequences for an input character sequence is determined. Since there are two candidate tables in Embodiment 2, the determination section 104 selects either one of the first and second candidate tables. Specifically, the text editing section 103 first instructs the determination section 104 to determine a candidate table. Having received this instruction from the text editing section 103, the determination section 104 instructs the environment information acquisition section 105 to acquire environment information. In response to the instruction from the determination section 104, the environment information acquisition section 105 acquires environment information, and passes it to the determination section 104. Based on the environment information received from the environment information acquisition section 105, the determination section 104 determines a candidate table to be used for presenting prospective character sequences. At the time when step S1 is performed, a screen on which to allow the user to input text (see FIG. 4) is displayed on the output section 3.

The process of steps S22 to S28 are similar to the processes of steps S2 to S8 shown in FIG. 5, except that the candidate table to be searched at step S23 and the candidate table to be updated at S28 are the candidate table determined at step S21.

Thus, according to Embodiment 2, the candidate table to be used for presenting prospective character sequences is switched depending on the environment information. As a result, candidate tables which are adapted to as many different environments as there are candidate tables can be generated.

FIG. 17 is a diagram illustrating an exemplary image of prospective character sequences displayed in the case where the first candidate table is used. FIG. 18 is a diagram illustrating an exemplary image of prospective character sequences displayed in the case where the second candidate table is used. Between FIG. 17 and FIG. 18, different prospective character sequences are displayed for the same input character sequence "あい(ai)". Thus, according to Embodiment 2, it is possible to generate candidate tables adapted to a plurality of environments by using a plurality of candidate tables. This improves the efficiency of text input operations performed by the user in the case where a plurality of environments exist.

For example, in the case where the environment information is the aforementioned time information, the candidate table may be switched depending on whether the current time falls in the daytime or the nighttime. Mores specifically, a candidate table reflecting work-related character conversions may be used if the current time falls in the daytime, whereas a candidate table reflecting non-work-related character conversions may be used if the current time falls in the nighttime. As a result, one of the candidate tables is customized so as to suit business purposes, whereas the other candidate table is customized so as to suit private purposes. Therefore, the efficiency of text input operations can be improved both in the case of using the text editing assistor for business purposes and in the case of using it for private purposes.

In Embodiment 2, the environment information may be position information, application information, or state information, instead of time information, as is the case with Embodiment 1. Although Embodiment 2 illustrates an example where there are two candidate tables, three or more candidate tables may be employed. Therefore, in the case where the environment information is application information, candidate tables which are adapted for the respective applications can be generated by preparing as many candidate tables as there are applications.

In Embodiments 1 and 2, the determination as to whether or not to perform learning at steps S7 and S27 is made based only on environment information. In other embodiments, the determination concerning learning may be made also in accordance with the method of selecting a final character sequence. Specifically, two kinds of methods for selecting a final character sequence may be provided, e.g., if the input section 2 includes a plurality of buttons, first and second buttons may be assigned to respectively different methods of selecting a final character sequence. In this case, it may be ensured that the candidate table is updated if the selection of a final character sequence is made by means of the first button, but not if the selection of a final character sequence is made by means of the second button. Such a structure will enable the user to manually make the determination as to whether or not to update the candidate table, which is illustrated as being automatically made in Embodiments 1 and 2.

In other embodiments, the determination as to whether or not to update the candidate table may be made based solely on the aforementioned two kinds of methods for selecting a final character sequence, without relying on the environment information. As a result, the switching between updating and not updating the candidate table can be made more easily than in the case where either a learning mode and a non-learning mode must be set in advance. In other words, such switching can be performed by the user each time a final character sequence is selected.

Although Embodiments 1 and 2 illustrate examples where the prospective character sequences are conversion candidate character sequences, the present invention is also applicable to the case where the prospective character sequences are prediction candidate character sequences. FIG. 19 shows an exemplary candidate table which associates input character sequences and prediction candidate character sequences. In each row of FIG. 19, the first character of a given input character sequence is associated with character sequences which begin with that character. For example, if the input character sequence "あ(a)" is input, the prospective character sequences which are associated with "あ(a)" in the candidate table are presented in the order as indicated by their numbers. Furthermore, if the input character sequence grows into "あい(ai)", only those character sequences whose first two characters are "あい(ai)" are selected from among the prospective character sequences associated with "あ(a)" in the candidate table, so as to be presented as prospective character sequences in the order of priority as indicated by their numbers. Thus, the present invention is indifferent as to whether the prospective character sequences are conversion candidate character sequences or prediction candidate character sequences. Moreover, the present invention is indifferent as to the data structure of the candidate table or the method of presenting prospective character sequences.

In Embodiments 1 and 2, the text editing assistor may comprise a dictionary table in addition to the candidate table. A dictionary table is a table which is referred to when an input character sequence is not found in the candidate table. It is commonplace to internalize such a dictionary table in a text editing assistor.

Furthermore, in Embodiments 1 and 2 above, the text editing assistor may comprise an inhibited sequence table in addition to the candidate table. An inhibited sequence table is a table associating each input character sequence with "inhibited character sequences", i.e., character sequences which are not to be presented as prospective character sequences for that input character sequence. Specifically, when the character sequence conversion section 101 searches the candidate table at steps S3 and S4 shown in FIG. 5, it pretends that any association between the input character sequence and an inhibited character sequence stored in the inhibited sequence table is not contained in the candidate table. Therefore, at step S5, any pair of an input character sequence and a prospective character sequence contained in the candidate table that is also contained in the inhibited sequence table is excluded from the prospective character sequences to be presented. Thus, by providing an inhibited sequence table, an effect similar to deleting an association between the input character sequence and the prospective character sequence from the candidate table can be obtained. By providing an inhibited sequence table, it becomes possible to prevent the displaying of character sequences which would be inconvenient for the user if displayed as prospective character sequences. Note that the inhibited sequence table may be editable by the user. The inhibited sequence table is preferably protected so that it cannot be viewed by any other user. Furthermore, the candidate table and inhibited sequence table may be acquired from outside of the text editing assistor, e.g., via the Internet.

While the invention has been described in detail, the foregoing description is in all aspects illustrative and not restrictive. It is understood that numerous other modifications and variations can be devised without departing from the scope of the invention.

What is claimed is:

1. A text editing assistor for displaying a prospective character sequence based on a character sequence which is input by a user, comprising:
    a table storing section for storing a candidate table which associates one or more prospective character sequences with a given character sequence;
    a candidate displaying section for displaying, in response to a character sequence which is input by the user, at least one prospective character sequence which is associated by the candidate table with the character sequence which has been input by the user;
    a character sequence finalization section for allowing the user to select one of the at least one prospective character sequence displayed by the candidate displaying section as a final character sequence;
    an environment information acquisition section for acquiring environment information concerning the text editing assistor or an environment thereof;
    a determination section for, when a final character sequence is selected by means of the character sequence finalization section, determining whether or not to update the candidate table based on the environment information; and
    a first updating section for updating the candidate table based on an association between the final character sequence selected by means of the character sequence finalization section and the character sequence which has been input by the user, the update being made only when the determination section determines that the candidate table is to be updated.

2. The text editing assistor according to claim 1, wherein,
    the environment information acquisition section acquires information indicating a current time as the environment information, and
    the determination section determines whether or not to update the candidate table based on the information indicating the current time.

3. The text editing assistor according to claim 1, wherein,
the environment information acquisition section acquires information indicating a current position of the text editing assistor as the environment information, and
the determination section determines whether or not to update the candidate table based on the information indicating the current position.

4. The text editing assistor according to claim 1, wherein,
the environment information acquisition section acquires information indicating a type of application which accepts an inputting of a character sequence as the environment information, and
the determination section determines whether or not to update the candidate table based on the information indicating the type of the application.

5. The text editing assistor according to claim 1, wherein the environment information acquisition section acquires information indicating a state of an application which accepts an inputting of a character sequence as the environment information, and
the determination section determines whether or not to update the candidate table based on the information indicating the state of the application.

6. The text editing assistor according to claim 1, further comprising:
an input accepting section which accepts at least two kinds of input methods for inputting a selection of a final character sequence by means of the character sequence finalization section; and
a second updating section operable to update the candidate table based on the association between the final character sequence selected by means of the character sequence finalization section and the character sequence which has been input by the user when the input accepting section accepts a selection of the final character sequence by the first input method, and not update the candidate table when the input accepting section accepts a selection of the final character sequence by a second input method which is different from the first input method.

7. The text editing assistor according to claim 1 further comprising:
a designation section for allowing the user to designate an association between a character sequence and a prospective character sequence in the candidate table, and
a deletion section for deleting from the candidate table the association between the character sequence and the prospective character sequence designated by means of the designation section.

8. The text editing assistor according to claim 1, wherein,
the candidate table associates a plurality of prospective character sequences, in an order of being displayed by the candidate displaying section, with a given character sequence,
the text editing assistor further comprising:
a changing section for changing the order of the prospective character sequences associated by the candidate table with the given character sequence.

9. The text editing assistor according to claim 1, wherein,
the table storing section further stores an inhibited sequence table which associates one or more inhibited character sequences with a given character sequence, the inhibited character sequences being inhibited from being displayed as prospective character sequences, and
the candidate displaying section displays, in response to the character sequence which is input by the user, at least one prospective character sequence which is associated by the candidate table with the character sequence which has been input by the user, excluding the inhibited character sequence(s) associated by the inhibited sequence table with the character sequence which has been input by the user.

10. A text editing assistor for displaying a prospective character sequence based on a character sequence which is input by a user, comprising:
a table storing section for storing a plurality of candidate tables each of which associates one or more prospective character sequences with a given character sequence, each candidate table containing a different set of such associations;
an environment information acquisition section for acquiring environment information concerning the text editing assistor or an environment thereof;
a table determination section for determining one of the plurality of candidate tables stored in the table storing section based on the environment information acquired by the environment information acquisition section;
a candidate displaying section for displaying, in response to a character sequence which is input by the user, at least one prospective character sequence which is associated by the candidate table determined by the table determination section with the character sequence which has been input by the user;
a character sequence finalization section for allowing the user to select one of the at least one prospective character sequence displayed by the candidate displaying section as a final character sequence; and
a first updating section for updating the candidate table determined by the table determination section based on an association between the final character sequence selected by means of the character sequence finalization section and the character sequence which has been input by the user.

11. The text editing assistor according to claim 10, wherein,
the environment information acquisition section acquires information indicating a current time as the environment information, and
the table determination section determines one of the plurality of candidate tables stored in the table storing section based on the information indicating the current time.

12. The text editing assistor according to claim 10, wherein,
the environment information acquisition section acquires information indicating a current position of the text editing assistor as the environment information, and
the table determination section determines one of the plurality of candidate tables stored in the table storing section based on the information indicating the current position.

13. The text editing assistor according to claim 10, wherein,
the environment information acquisition section acquires information indicating a type of application which accepts an inputting of a character sequence as the environment information, and
the table determination section determines one of the plurality of candidate tables stored in the table storing section based on the information indicating the type of the application.

14. The text editing assistor according to claim 10, wherein the environment information acquisition section acquires information indicating a state of an application which accepts an inputting of a character sequence as the environment information, and the table determination section determines one of the plurality of candidate tables stored in the table storing section based on the information indicating the state of the application.

15. The text editing assistor according to claim 10, further comprising:

an input accepting section which accepts at least two kinds of input methods for inputting a selection of a final character sequence by means of the character sequence finalization section; and a second updating section operable to update the candidate table determined by the table determination section based on the association between the final character sequence selected by means of the character sequence finalization section and the character sequence which has been input by the user when the input accepting section accepts a selection of the final character sequence by the first input method, and not update the candidate table when the input accepting section accepts a selection of the final character sequence by a second input method which is different from the first input method.

16. The text editing assistor according to claim 10, wherein, the table storing section further stores an inhibited sequence table which associates one or more inhibited character sequences with a given character sequence, the inhibited character sequences being inhibited from being displayed as prospective character sequences, and the candidate displaying section displays, in response to the character sequence which is input by the user, at least one prospective character sequence which is associated by the candidate table with the character sequence which has been input by the user, excluding the inhibited character sequence(s) associated by the inhibited sequence table with the character sequence which has been input by the user.

17. A computer storage medium have stored therein a program to be executed by a computer in a text editing assistor for displaying a prospective character sequence based on a character sequence which is input by a user, the text editing assistor comprising a table storing section for storing a candidate table which associates one or more prospective character sequences with a given character sequence, wherein the program causes the computer to execute:

a candidate displaying step of displaying, in response to a character sequence which is input by the user, at least one prospective character sequence which is associated by the candidate table with the character sequence which has been input by the user;

a character sequence finalization step of allowing the user to select one of the at least one prospective character sequence displayed in the candidate displaying step as a final character sequence;

an environment information acquisition step of acquiring environment information concerning the text editing assistor or an environment thereof;

a determination step for, when a final character sequence is selected in the character sequence finalization step, determining whether or not to update the candidate table based on the environment information; and a first updating step of updating the candidate table based on an association between the final character sequence selected in the character sequence finalization step and the character sequence which has been input by the user, the update being made only when the determination step determines that the candidate table is to be updated.

18. A computer storage medium have stored therein a program to be executed by a computer in a text editing assistor for displaying a prospective character sequence based on a character sequence which is input by a user, the text editing assistor comprising a table storing section for storing a plurality of candidate tables each of which associates one or more prospective character sequences with a given character sequence, each candidate table containing a different set of such associations, wherein the program causes the computer to execute:

an environment information acquisition step of acquiring environment information concerning the text editing assistor or an environment thereof;

a table determination step of determining one of the plurality of candidate tables stored in the table storing section based on the environment information acquired in the environment information acquisition step;

a candidate displaying step of displaying, in response to a character sequence which is input by the user, at least one prospective character sequence which is associated by the candidate table determined in the table determination step with the character sequence which has been input by the user;

a character sequence finalization step of allowing the user to select one of the at least one prospective character sequence displayed in the candidate displaying step as a final character sequence; and a first updating step of updating the candidate table determined in the table determination step based on an association between the final character sequence selected in the character sequence finalization step and the character sequence which has been input by the user.

19. A method for use with a text editing assistor for displaying a prospective character sequence based on a character sequence which is input by a user, the text editing assistor comprising a table storing section for storing a candidate table which associates one or more prospective character sequences with a given character sequence, wherein the method comprises:

a candidate displaying step of displaying, in response to a character sequence which is input by the user, at least one prospective character sequence which is associated by the candidate table with the character sequence which has been input by the user;

a character sequence finalization step of allowing the user to select one of the at least one prospective character sequence displayed in the candidate displaying step as a final character sequence;

an environment information acquisition step of acquiring environment information concerning the text editing assistor or an environment thereof;

a determination step for, when a final character sequence is selected in the character sequence finalization step, determining whether or not to update the candidate table based on the environment information; and a first updating step of updating the candidate table based on an association between the final character sequence selected in the character sequence finalization step and the character sequence which has been input by the user, the update being made only when the determination step determines that the candidate table is to be updated.

20. A method for use with a text editing assistor for displaying a prospective character sequence based on a character sequence which is input by a user, the text editing assistor comprising a table storing section for storing a plurality of candidate tables each of which associates one or more prospective character sequences with a given character sequence, each candidate table containing a different set of such associations, wherein the method comprises:

an environment information acquisition step of acquiring environment information concerning the text editing assistor or an environment thereof;

a table determination step of determining one of the plurality of candidate tables stored in the table storing section based on the environment information acquired in the environment information acquisition step;

a candidate displaying step of displaying, in response to a character sequence which is input by the user, at least one prospective character sequence which is associated by the candidate table determined in the table determination step with the character sequence which has been input by the user;

a character sequence finalization step of allowing the user to select one of the at least one prospective character sequence displayed in the candidate displaying step as a final character sequence; and a first updating step of updating the candidate table determined in the table determination step based on an association between the final character sequence selected in the character sequence finalization step and the character sequence which has been input by the user.

* * * * *